United States Patent [19]

Kurosu et al.

[11] Patent Number: 5,172,675
[45] Date of Patent: Dec. 22, 1992

[54] POWER SUPPLY CIRCUIT FOR AN INTERNAL COMBUSTION ENGINE

[75] Inventors: Shinichi Kurosu, Ageo, Japan; Ian P. Hart, Greenbush, Minn.

[73] Assignees: Fuji Jukogyo Kabushiki Kaisha, Tokyo, Japan; Polaris Industries L.P., Minneapolis, Minn.

[21] Appl. No.: 862,353

[22] Filed: Apr. 2, 1992

Related U.S. Application Data

[63] Continuation of Ser. No. 602,601, Oct. 24, 1990, abandoned.

[51] Int. Cl.$^5$ .............................................. F02P 1/00
[52] U.S. Cl. .............................. 123/599; 123/149 A
[58] Field of Search .......... 123/149 R, 149 A, 149 D, 123/149 FA, 599

[56] References Cited

U.S. PATENT DOCUMENTS

| | | | |
|---|---|---|---|
| 1,262,587 | 4/1918 | Jepson | 310/127 |
| 1,269,344 | 6/1918 | Wacker | 290/41 |
| 1,458,139 | 6/1923 | de Pontois | 310/70 R |
| 1,476,733 | 12/1923 | Smith | 290/41 |
| 3,746,901 | 7/1973 | Haubner et al. | 310/70 R |
| 3,942,501 | 3/1976 | Byles | 123/599 |
| 4,160,435 | 7/1979 | Sleder | 123/599 |
| 4,550,267 | 10/1985 | Vaidya | 310/184 |
| 4,873,962 | 10/1989 | Safranek | 123/599 |
| 5,024,205 | 6/1991 | Gatza et al. | 123/632 |

FOREIGN PATENT DOCUMENTS 63-255543 10/1988 Japan.

*Primary Examiner*—Tony M. Argenbright
*Attorney, Agent, or Firm*—Martin A. Farber

[57] ABSTRACT

The internal combustion engine has a battery and a magneto for an ignition system of the engine. The magneto has a charge coil and a source coil for generating a first alternating current and a second alternating current, respectively. The alternating current is rectified and the rectified current is supplied to the battery for charging. The second alternating current is supplied to electric loads to be operated by the engine.

8 Claims, 4 Drawing Sheets

POWER SUPPLY CIRCUIT FOR AN INTERNAL COMBUSTION ENGINE

RELATED APPLICATION

This application is a continuation application of Ser. No. 07/602,601 filed Oct. 24, 1990 now abandoned.

BACKGROUND OF THE INVENTION

The present invention relates to a power supply circuit for an internal combustion engine and more particularly to a circuit for separately supplying power to an electronic system for controlling the engine and to loads such as lamps.

In a small engine for a vehicle such as a snowmobile, a magneto for a capacitor discharge ignition (CDI) is adapated to generate alternating current for the loads such as the lamps and a heater of the vehicle. Furthermore, in a vehicle having a battery, the magneto supplies power to charge the battery.

Usually, the magneto is provided in a two-cycle engine which is equipped with an electronic control system for controlling various components of the engine, such as fuel injectors. Japanese Patent Application Laid-Open 63-255543 discloses a fuel injection control system in which the CDI is operated by the magneto.

There are two methods for supplying the power from the magneto to the loads.

(1) As shown in FIG. 2, alternating current generated by a magneto 50 is regulated by a voltage regulator 51 to a predetermined voltage. The regulated voltage is rectified to direct current by a rectifier 52 which is connected to electric loads 53 such as lamps and a heater, to a battery 54, and to an electronic control unit 55.

(2) As shown in FIG. 3, alternating current generated by the magneto 50 is regulated by the voltage regulator 51 to a predetermined voltage which is fed to the loads 53, while the alternating current is rectified to the direct current voltage by a rectifier 56 (half-rectification) which is connected to the battery 54 and to the electronic control unit 55.

The output voltage of the magneto 50 changes in accordance with engine speed. When the engine speed is low, the output voltage is low. If the power is consumed by the electric loads 53 in a low voltage state, the battery 54 is not charged, but discharged to the contrary. In order to solve the problem, another battery having a large capacity must be provided, which causes increases of weight of the vehicle and space for equipping the battery.

For safety of the snowmobile, a headlight thereof is turned on during an operation even in the daytime because of safety. Furthermore, a heater such as a hand warmer is often used. As a result, the battery 54 is not sufficiently charged, so that the operation of the electronic control unit 55 becomes unstable, causing malfunction of the engine.

SUMMARY OF THE INVENTION

An object of the present invention is to provide a power supply circuit for an engine in which charging a battery is ensured to that an electronic control system is stably applied with power without influence of other electric loads.

According to the present invention, there is provided a power supply circuit for an internal combustion engine having a battery and a magneto for an ignition system of the engine, comprising the magneto having a charge coil and a source coil for generating a first alternating current and a second alternating current respectively, a rectifier for rectifying the first alternating current, a first circuit for supplying the rectified current to the battery, a second circuit for supplying the second alternating current to electric loads to be operated by the engine.

The engine has a fuel injector and a control unit for electrically controlling the ignition system and the fuel injector. A third circuit is provided for supplying the rectified current to the control unit and to the fuel injector.

The other objects and features of the present invention will become understood from the following description with reference to the accompanying drawings.

DETAILED DESCRIPTION OF THE PREFERRED EMBODIMENT

Figure 1A:
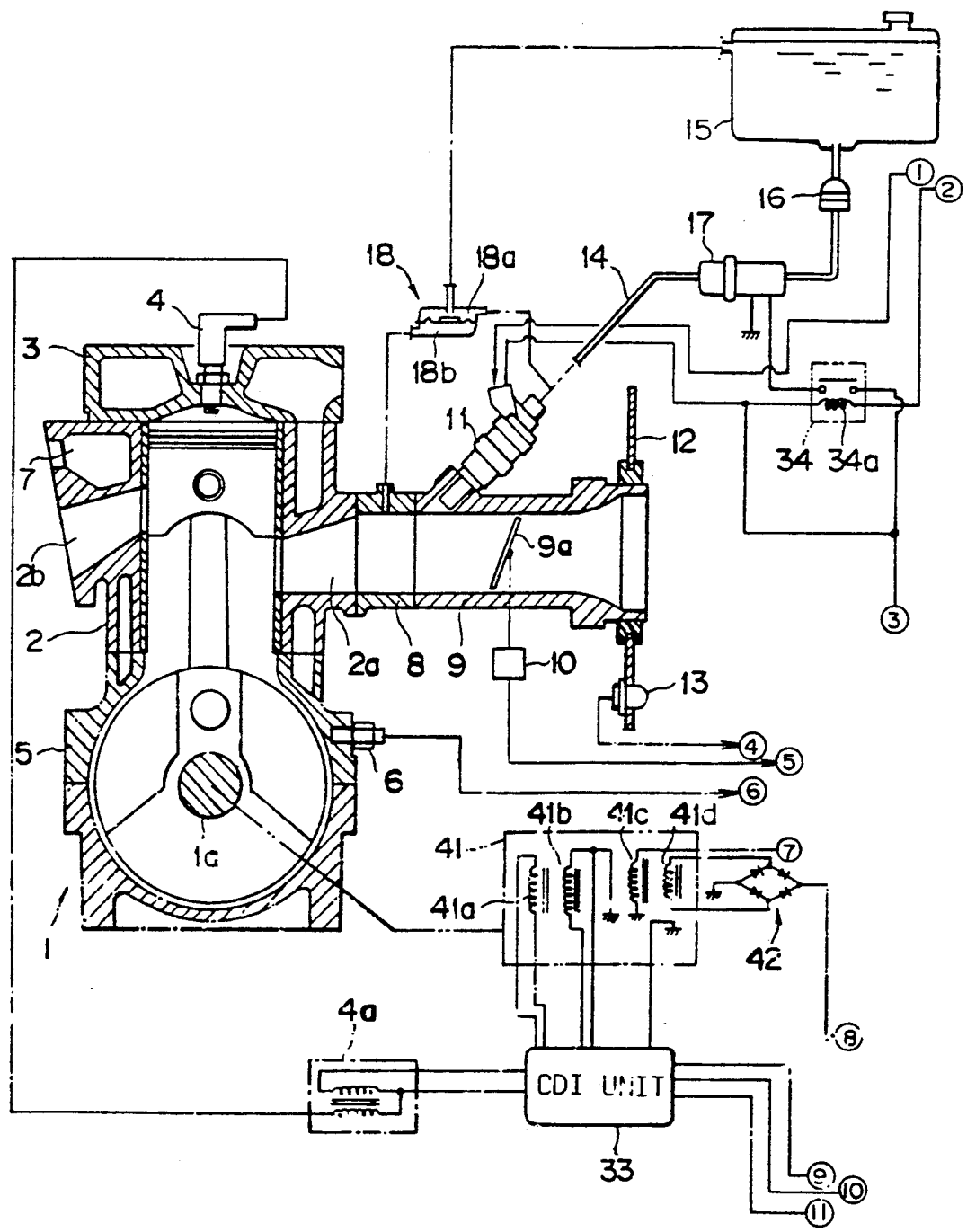
FIGS. 1a to 1c are schematic diagrams showing a control system for an engine including a circuit of the present invention.
Figure 1B:
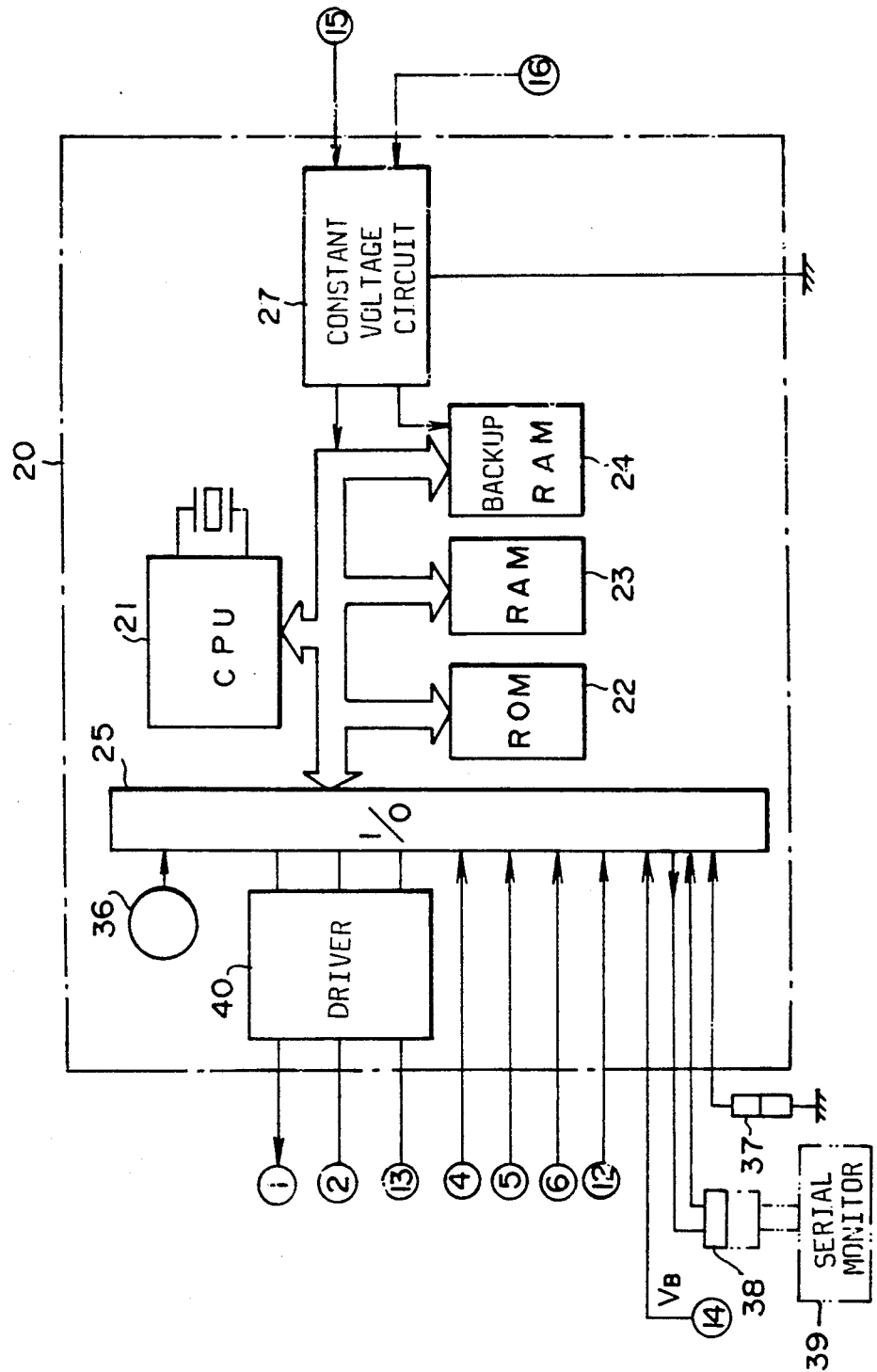
Figure 1C:
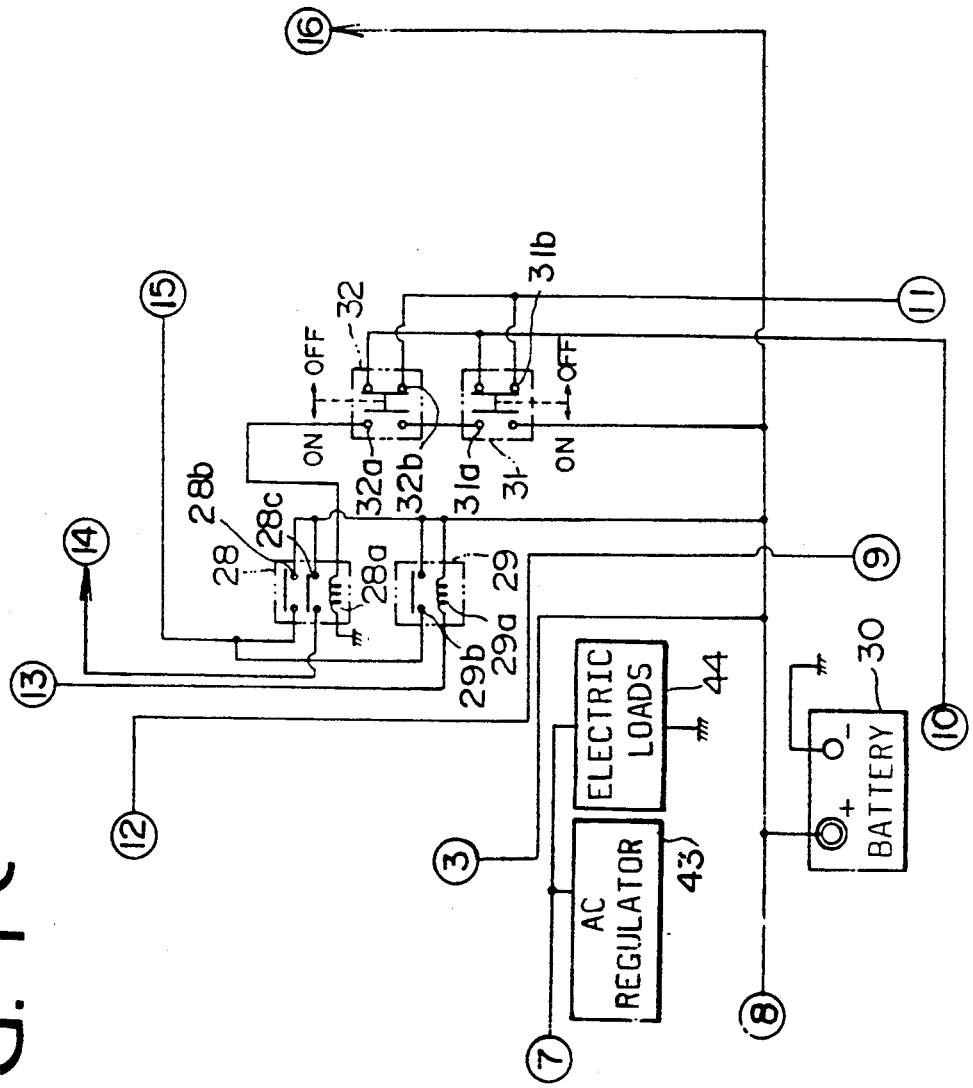
Figure 2:
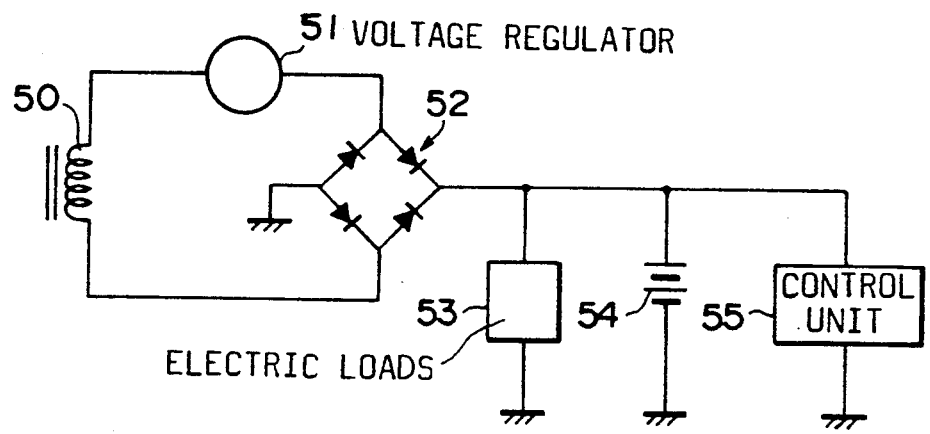
FIGS. 2 and 3 are power supply circuits.
Figure 3:
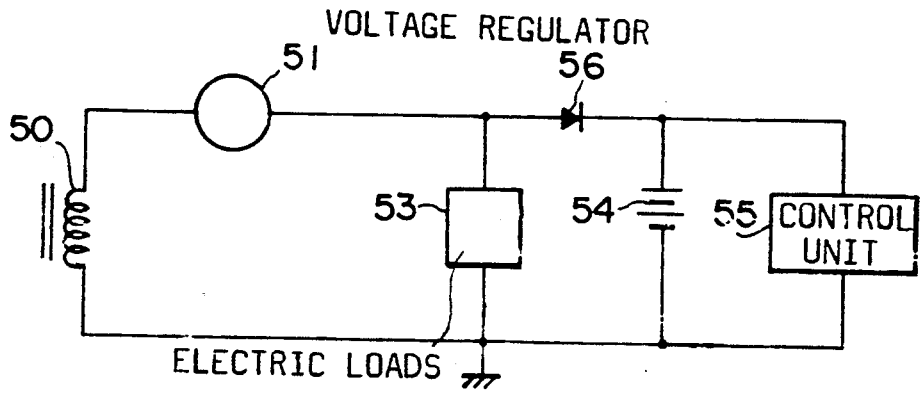

Referring to FIGS. 1a to 1c showing a two-cycle three-cylinder engine 1 for a snowmobile, a cylinder 2 of the engine 1 has an intake port 2a and an exhaust port 2b. A spark plug 4 is located in each combustion chamber formed in a cylinder head 3. A crankcase temperature sensor 6 is provided on a crankcase 5. Water jackets 7 are provided in the crankcase 5, the cylinder 2 and the cylinder head 3. The intake port 2a is communicated with an intake manifold 9 through an insulator 8. A throttle valve 9a is provided in the intake manifold 9. A throttle position sensor 10 is attached to the intake manifold 9. A fuel injector 11 is provided in the intake manifold 9 adjacent the intake port 2a. The intake manifold 9 is communicated with an air box 12 having an air cleaner (not shown). An intake air temperature sensor 13 is mounted on the air box 12.

Fuel in a fuel tank 15 is supplied to the injector 11 through a fuel passage 14 having a filter 16 and a pump 17.

The fuel injector 11 is communicated with a fuel chamber 18a of a pressure regulator 18 and the fuel tank 15 is communicated with an outlet of the fuel chamber 18a. A pressure regulating chamber 18b is communicated with the intake manifold 9.

The fuel in the tank 15 is supplied to the fuel injector 11 and the pressure regulator 18 by the pump 17 through the filter 16. A difference between an inner pressure of the intake manifold 9 and a fuel pressure applied to the injector 11 is maintained at a predetermined value by the pressure regulator 18 so as to prevent fuel injection quantity of the injector 11 from changing.

An electronic control unit (ECU) 20 having a microcomputer comprises a CPU (central processing unit) 21, a ROM 22, a RAM 23, a backup RAM 24 and an input/output interface 25, which are connected to each other through a bus line 26. A predetermined voltage is supplied from a constant voltage circuit 27. The constant voltage circuit 27 is connected to a battery 30 through a contact 28b of an ECU relay 28 and a contact 29b of a self-shut relay 29 which are parallely connected with each other. Furthermore, the battery 30 is directly connected to the constant voltage circuit 27 so that the backup RAM 24 is backed up by the battery 30 so as to maintain stored data even if a key switch (not shown) is in off-state. Sensors 6, 10 and 13 are connected to input ports of the input/output interface 25. An atmospheric pressure sensor 36 is provided in the control unit 20 and connected to an input port of the input/output interface 25. Output ports of the interface 25 are connected to a driver 40 which is connected to injectors 11 and a coil 34a of a relay 34 for the pump 17.

The ECU relay 28 has a pair of contacts 28b and 28c and an electromagnetic coil 28a. As hereinbefore described, the contact 28b is connected to the constant voltage circuit 27 and the battery 30. The other contact 28c is connected to the input port of the I/O interface 25 and the battery 30 for monitoring a voltage VB of the battery 30. The coil 28a of the relay 28 is connected to the battery 30 through ON-terminals 32a, 31a of a kill switch 32 and an ignition switch 31.

The kill switch 32 is provided on a grip (not shown) of the snowmobile to stop the engine 1.

ON-terminals 31a and 32a of the ignition switch 31 and the kill switch 32 are connected to each other in series and OFF-terminals 31b and 32b of the switches 31 and connected to each other in parallel. When both the switches 31 and 32 are turned on, power from the battery 30 is supplied to the coil 28a of the relay 28 to excite the coil 28d to close each contact. Thus, the power from the battery 30 is supplied to the constant voltage circuit 27 through the contact 28b for controlling the control unit 20.

The self-shut relay 29 has the contact 29b connected to the constant voltage circuit 27 and the battery 30 and a coil 29a connected to the output port of the I/O interface 25 through the driver 40 and the battery 30.

When one of the switches 31 and 32 is turned off, the engine 1 stops. After stopping the engine 1, the power from the battery 30 is supplied to the coil 29a of the self-shut relay 29 for a predetermined period (for example, ten minutes) by the operation of the control unit, thereby supplying the power to the control unit 20 for the period.

When the engine is restarted while the engine 1 is warm within the period, the quantity of the fuel injected from the injector 11 is corrected to a proper value, so that restarting the engine 1 in a hot engine condition is ensured.

The battery 30 is further connected to the coil 34a of the fuel pump relay 34 and to the injector 11 and the pump 17 through a contact of the relay 34.

Furthermore, a CDI unit 33 is provided as an ignition device. The CDI unit 33 is connected to a primary coil of an ignition coil 4a and to the spark plug 4 through a secondary coil. A signal line of the CDI unit 33 is connected to the input port of the I/O interface 25 of the control unit 20 for applying CDI pulses. When one of the switches 31 and 32 is turned off, lines for the CDI unit are short-circuited to stop the ignition operation.

A magneto 41 for generating alternating current is connected to a crankshaft 1a of the engine 1. The magneto 41 has an exciter coil 41a, a pulser coil 41b, a source coil 41c and a charge coil 41d. The pulser coil 41b is connected to the CDI unit 33. The source coil 41c is connected to an AC regulator 43, so that the voltage is regulated, and the regulated voltage is applied to an electric load 44 such as lamps, a heater and various accessories of the vehicle. Namely, the regulated output of the magneto 41 is independently supplied to the electric load 44. The charge coil 41d is connected to the battery 30 through a rectifier 42.

The power from the battery 30 is supplied to the electric loads of the electronic control system such as the injector 11, the pump 17, the control unit 20, the coils 28a, 29a and 34a of the relays 28, 29 and 34. During engine operation, the alternating current from the charge coil 41d is rectified by the rectifier 42 to charge the battery 30.

The CPU 21 calculates an engine speed N from a duration of pulses of the CDI pulse signals from the CDI unit 33 in accordance with the control programs stored in the ROM 22. Based on the engine speed N and a throttle valve opening degree from the throttle position sensor 10, a basic fuel injection pulse width Tp is calculated.

The basic fuel injection pulse width Tp is corrected with various data stored in the RAM 23 to that an actual fuel injection pulse width Ti is calculated. The I/O interface 25 produces a driving signal of the pulse width Ti as a trigger signal of the CDI pulse signal which is applied to the fuel injector 11 through the driver 40.

As a self-diagnosis function of the system, a connector 37 for changing a diagnosis mode and a connector 38 for diagnosing the engine 1 are connected to the input ports of the I/O interface 25. A serial monitor 39 is connected to the control unit 20 through the connector 38. The trouble mode changing connector 37 operates to change the self-diagnosis function of the control unit 20 into either a U(user)-check mode or D(dealer)-check mode. In a normal state, the connector 37 is set in the U-check mode. When an abnormality occurs in the system during the driving of the vehicle, trouble data are stored and kept in the backup RAM 24. At a dealer's shop, the serial monitor 39 is connected through the connector 38 to read the data stored in the RAM 24 for diagnosing the trouble of the system. The connector 37 is changed to the D-check mode to diagnose the trouble more in detail.

The electric loads such as the lamps, the heater and various accessories of the vehicle consume large electric power. Moreover, power consumption of the snowmobile largely changes in dependency on weather conditions.

In the conventional system, since power supply to the electric loads and for changing the battery are performed through the same system, the battery is not sufficiently charged. Therefore, voltage applied to the electronic control system is reduced, which causes various troubles such as little fuel supply from the fuel pump and decreasing the amount of the fuel injected from the injector.

Furthermore, if the output voltage of the battery 30 reduces, inaccurate information is applied to the control unit 20, causing erroneous operations of the system, such as setting an improper of the air-fuel ratio. If the output voltage of the battery 30 reduces lower than that for the constant voltage circuit 27, the control system can not operate.

In accordance with the present invention, the magneto for the ignition system has one charge coil to charge the battery and another source coil to supply the power to the electric loads. Thus, the power is stably supplied to the electronic control system without being effected by power changes caused by the other electric loads so that the control system accurately operates. In addition, charging the battery is properly controlled.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A power supply circuit for an internal combustion engine having a battery and a magneto connected to the engine and for supplying current to an ignition system of the engine, the circuit comprising:
   a charge coil and a source coil provided on said magneto for generating a first alternating current and a second alternating current respectively;
   a rectifier responsive to said first alternating current for rectifying said current and for producing a rectified current;
   a first circuit responsive to said rectified current for charging said battery;
   a second circuit for supplying the second alternating current to electric loads to be operated by said engine;
   a fuel injector provided on said engine for injecting fuel in an intake manifold of said engine;
   a control unit of the engine for electrically controlling said fuel injector; and
   a third circuit connected to said first circuit for supplying said rectified current to said control unit and to said fuel injector so as to prevent changing power supplied to said control unit to provide accurate operation of said control unit of the engine.

2. A power supply circuit for an internal combustion engine having a battery and a magneto for an ignition system of the engine, comprising:
   a charge coil and a source coil provided on said magneto for generating a first alternating current and a second alternating current respectively;
   a rectifier responsive to said first alternating current for rectifying said current and for producing a rectified current;
   a first circuit responsive to said rectified current for charging said battery;
   a second circuit for supplying the second alternating current to electric loads to be operated by said engine; and
   a fuel injector and a control unit for electrically controlling said ignition system and said fuel injector; and
   a third circuit for supplying said rectified current to said control unit and to said fuel injector.

3. A power supply circuit for an internal combustion engine having a battery and a magneto for an ignition system of the engine, comprising:
   a charge coil and a source coil provided on said magneto for generating a first alternating current and a second alternating current respectively;
   a rectifier responsive to said first alternating current for rectifying said current and for producing a rectified current;
   a first circuit responsive to said rectified current for charging said battery;
   a second circuit for supplying the second alternating current to electric loads to be operated by said engine; and
   said loads are lamps of a motor vehicle to be driven by said engine.

4. A power supply circuit for an internal combustion engine having a battery and a magneto for an ignition system of the engine, the circuit comprising:
   a charge coil and a source coil provided on said magneto for generating a first alternating current and a second alternating current respectively;
   a rectifier responsive to said first alternating current for rectifying said current and for producing a rectified current;
   a first circuit responsive to said rectified current for charging said battery;
   a second circuit for supplying the second alternating current to electric loads to be operated by said engine; and
   said loads are lamps of a motor vehicle to be driven by said engine so as to properly control the charging of the battery.

5. A power supply circuit for an internal combustion engine having a battery and a magneto connected to said engine for an ignition system of the engine, the circuit comprising:
   electric control means provided on said engine for controlling said engine;
   said magneto comprising a charge coil and a source coil for generating a first alternating current and a second alternating current respectively;
   a rectifier responsive to said first alternating current for rectifying said current and producing a rectified current;
   a first circuit connected to said rectifier for supplying said rectified current to said electric control means; and
   a second circuit for supplying the second alternating current to electric loads to be operated by said engine so as to provide accurate operation of the control means of the engine.

6. A power supply circuit for an internal combustion engine having a battery and a magneto for an ignition system of the engine, the circuit comprising:
   a charge coil and a source coil provided on said magneto for generating a first alternating current and a second alternating current respectively;
   a rectifier responsive to said first alternating current for rectifying said current and for producing a rectified current;
   a first circuit responsive to said rectified current for charging said battery;
   a second circuit for supplying the second alternating current to an electric load to be operated by said engine; and
   said load is a heater of a motor vehicle to be driven by said engine.

7. A power supply circuit for an internal combustion engine having a battery and a magneto for an ignition system of the engine, the circuit comprising:
   electric control means provided on said engine for controlling said engine;
   a charge coil and a source coil provided on said magneto for generating a first alternating current and a second alternating current respectively;
   a rectifier responsive to said first alternating current for rectifying said current and for producing a rectified current;
   a first circuit responsive to said rectified current for charging said battery and for supplying said rectified current to said electric control means;

a second circuit for supplying the second alternating current to electric loads to be operated by said engine; and said electric loads are electric loads of a motor vehicle other than electric loads of the control means.

8. A power supply circuit for an internal combustion engine having a battery and a magneto for an ignition system of the engine, the circuit comprising:

a charge coil and a source coil provided on said magneto for generating a first alternating current and a second alternating current respectively;

a rectifier responsive to said first alternating current for rectifying said current and for producing a rectified current;

a first circuit responsive to said rectified current for charging said battery;

a second circuit for supplying the second alternating current to electric loads to be operated by said engine; and said electric loads are electric loads of a motor vehicle other than electric loads of the battery and the ignition system.

* * * * *